United States Patent [19]

Miedema

[11] 4,330,764
[45] May 18, 1982

[54] MULTIPATH FADE EQUALIZER

[75] Inventor: Hotze Miedema, Boxford, Mass.

[73] Assignee: Bell Telephone Laboratories, Incorporated, Murray Hill, N.J.

[21] Appl. No.: 158,404

[22] Filed: Jun. 11, 1980

[51] Int. Cl.³ .......................................... H03H 11/06
[52] U.S. Cl. .................................... 333/18; 307/262; 307/264; 455/304; 455/305
[58] Field of Search ................ 333/18, 28 R; 330/86, 330/107, 282, 294; 375/14; 455/52, 304-306

[56] References Cited

U.S. PATENT DOCUMENTS

| | | |
|---|---|---|
| 2,896,176 | 7/1959 | Bellows, Jr. |
| 3,321,719 | 5/1967 | Kaenel. |
| 3,447,103 | 5/1969 | Port. |
| 3,638,134 | 1/1972 | Beurrier et al. ................ 330/107 X |
| 4,261,056 | 4/1981 | Barnett et al. ...................... 455/273 |

Primary Examiner—Paul L. Gensler
Attorney, Agent, or Firm—S. Sherman

[57] ABSTRACT

An adaptive multipath fade equalizer is disclosed comprising differencing means (24) for forming a difference between an input equal to said equalizer and a component of the equalizer output signal and a feedback loop (21) for coupling said component of output signal to the differencing means. The feedback loop includes a fixed delay T (22), a variable attenuator (23) and a variable phase shifter (25). A phase control network (30) and an attenuation control network (31) compare selected portions of the frequency spectrum of the signal and adjust the variable controls to minimize the effects of multipath fades upon the signal. It is an advantage of the equalizer that it automatically adjusts for changes in the frequency and depth of the fade notch.

9 Claims, 11 Drawing Figures

FLOW CHART FOR CONTROL OF
FADING EQUALIZER
(CONTROL OF $f_e$ AND $\phi$)

MULTIPATH FADE EQUALIZER

TECHNICAL FIELD

The invention relates to signal equalizers and, in particular, to adaptive fade equalizers.

BACKGROUND OF THE INVENTION

It has been found that amplitude and delay distortion resulting from multipath fading can, under certain conditions, be a major cause of transmission deterioration in both digital and FM radio communications systems. Experimental and analytical evidence indicate that outages of wideband digital systems, caused by this phenomenon (i.e., selective fading), may exceed system performance objectives. This means that techniques for handling flat fades, such as AGC, will not be adequate to maintain satisfactory wideband digital transmission, and that additional correction will be required. Even the use of space diversity techniques will not eliminate the problem associated with selective fading. The use of some form of equalization will still be required to achieve the desired level of system performance, (see U.S. Pat. No. 4,261,056.)

The problem, however, is that signal fading resulting from multipath transmission is basically unpredictable. Accordingly, the compensation introduced by a fade equalizer must be capable of automatically adapting to the changing signal conditions.

SUMMARY OF THE INVENTION

An adaptive fade equalizer in accordance with the present invention comprises: a differencing means, for forming the difference between an input signal to the equalizer and a component of the equalizer output signal; an adjustable feedback loop for coupling the output signal component to the differencing means; and the necessary control circuits for adjusting the feedback loop in response to changing input signal conditions. The feedback loop includes a fixed time delay, an adjustable phase shifter, and an adjustable attenuator. The adjustable phase shift tunes the feedback loop in response to changes in the frequency of the fade notch. The adjustable gain control adjusts the gain of the feedback loop in response to changes in the relative amplitudes of selected frequency components in the equalizer output signal.

The equalizer is adapted to track changes in the frequency and amplitude of the fade notch and to provide dynamic compensation in accordance with these changes.

Under specified signal conditions, an equalizer in accordance with the invention provides both amplitude and group delay equalization, resulting in a fourfold improvement in system performance.

DETAILED DESCRIPTION

Figure 1:
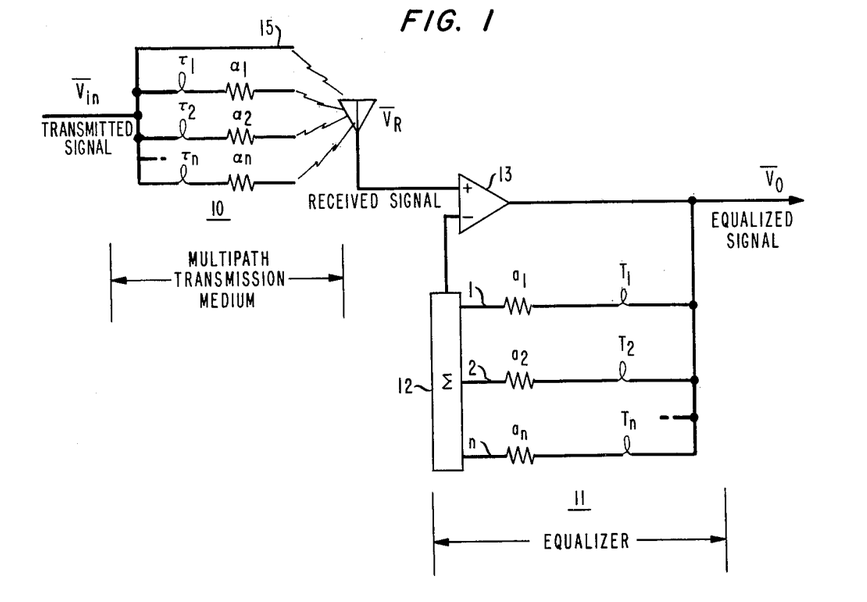
FIG. 1 shows a multipath radio transmission system and an appropriate equalizer.

Referring to the drawings, FIG. 1 shows a radio transmission system including a multipath transmission medium 10 and a corresponding multipath recursive equalizer 11.

The transmission medium is represented by n+1 paths, n of which have attenuations and delays of $\alpha_1, \alpha_2, \ldots \alpha_n$ and $\tau_1, \tau_2 \ldots \tau_n$, respectively, relative to the primary wavepath represented by 15. The equalizer comprises n feedback paths 1, 2 ... n, each of which includes a delay $T_i$ and an attenuator $a_i$. The feedback signals are summed in a summing network 12 and the resulting signal thus obtained is subtracted from the received signal $\overline{V}_R$ in a differencing network 13 to produce the equalized out signal $\overline{V}_o$.

The response of the system illustrated in FIG. 1 is given by $$\frac{\overline{V}_o}{\overline{V}_{in}} = \frac{1 + a_1 e^{-j\omega\tau 1} + a_2 e^{-j\omega\tau 2} \ldots + a_n e^{-j\omega\tau n}}{1 + a_1 e^{-j\omega T1} + a_2 e^{-j\omega T2} \ldots + a_n e^{-j\omega Tn}}. \quad (1)$$

As is evident, the system is perfectly equalized when the medium and equalizer are matched, i.e., $\tau_i = T_i$ and $\alpha_i = a_i$, for all i $(1 \leq i \leq n)$.

In a moderately broadband system, multipath fading effects are reasonably represented by a two-path model. However, inasmuch as the medium delay $\tau$ and the medium gain $\alpha$ are not constants, but vary as a function of time, it would appear to be difficult, if not impossible, to devise an adaptive equalizer capable of providing good, dynamic equalization. Notwithstanding medium changes, however, it will be shown that such equalization can be obtained by means of the simplified equalizer circuit shown in FIG. 2. As illustrated, the transmission medium 10 is characterized as a two-path medium 15-16 where the second path 16 has a delay $\tau$ and attenuation $\alpha$. The equalizer 11 is characterized by a single feedback loop 17 having an attenuation a, a delay T, and a frequency independent phase shift $\phi$. The equalizer is adjusted by varying the attenuation parameter a and the phase shift $\phi$. The delay T is maintained constant.

Figure 2:
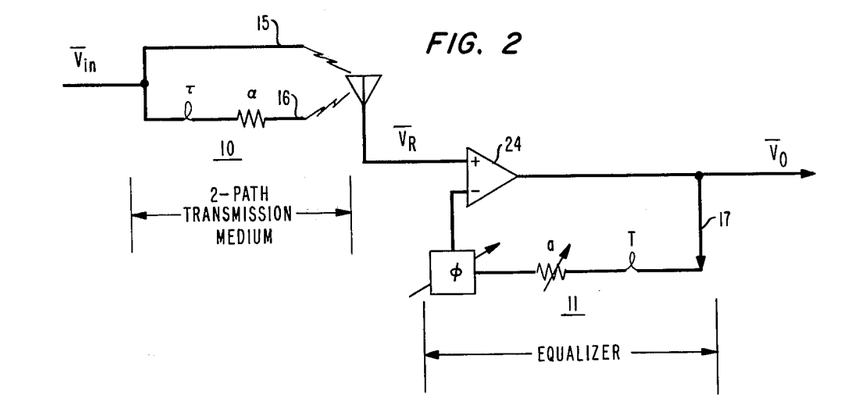
FIG. 2 shows a two-path model of a radio transmission system and a simplified equalizer.

The overall transfer function for this system is given by $$\frac{\overline{V}_o}{\overline{V}_{in}} = \overline{R} = \frac{1 + \alpha e^{-j\omega\tau}}{1 + ae^{-j(\omega T + \phi)}}. \quad (2)$$

The magnitude of the transfer function is then $$R^2 = \frac{1 + \alpha^2 + 2\alpha \cos \omega\tau}{1 + a^2 + 2a \cos (\omega T + \phi)}. \quad (3)$$

Maximum equalizer gain is obtained at that frequency $f_e$ for which the phase shift in the loop is $\pi + 2\pi n$. This occurs when $$\omega_e T + \phi = \pi + 2\pi n \tag{4}$$

from which it follows that $f_e$ is adjustable by varying $\phi$.

The medium gain is minimum, producing a fade minimum at a frequency $f_f$ when $$\omega_f \tau = \pi + 2\pi m. \tag{5}$$

Adding $\omega T$ and $\omega \tau$ to both sides of equations (4) and (5), respectively, we obtain $$\omega T + \phi = \pi + (\omega - \omega_e) T + 2\pi n \tag{6}$$

and $$\omega \tau = \pi + (\omega - \omega_f) \tau + 2\pi m. \tag{7}$$

Substituting (6) and (7) in (3) gives $$R^2 = \frac{1 + \alpha^2 - 2\alpha \cos(\omega - \omega_f)\tau}{1 + a^2 - 2a \cos(\omega - \omega_e)T}. \tag{8}$$

Finally, a new variable $\Delta f$ is introduced such that $$\Delta f = f - f_c, \tag{9}$$

where $f_c$ is the center frequency of the band of interest. Noting that $$\omega - \omega_f = \omega_c - \omega_f + \Delta\omega \tag{10}$$

and $$\omega - \omega_e = \omega_c - \omega_e + \Delta\omega,$$

equation (8) becomes $$R^2 = \frac{1 + \alpha^2 - 2\alpha\{\cos(\omega_c - \omega_f)\tau \cdot \cos\Delta\omega\tau - \sin(\omega_c - \omega_f)\tau \cdot \sin\Delta\omega\tau\}}{1 + a^2 - 2a\{\cos(\omega_c - \omega_e)T \cdot \cos\Delta\omega T - \sin(\omega_c - \omega_e)T \cdot \sin\Delta\omega T\}} \tag{11}$$

For purposes of illustration and explanation, let us consider a typical 4 GHz system with an average path length D between stations of 25.6 miles and a half bandwidth $\Delta f \leq 10$ MHz. Using these numbers in Ruthroff's formula $$\tau = 3.7 \left(\frac{D}{20}\right)^3 \tag{12}$$

(See C. L. Ruthroff, "Multiple-Path Fading on Line-of-Sight Microwave Radio Systems as a Function of Path Length and Frequency," BSTJ, September 1971, p. 2375) for the maximum delay difference, we obtain $\tau = 7.7$ ns. If we also make T no greater than 7.7 ns, we have $$\Delta\omega\tau \leq 2\pi 0.077$$

and $$\Delta\omega T \leq 2\pi 0.077.$$

For these small values of $\Delta\omega\tau$ and $\Delta\omega T$, we can use the approximations $$\sin\Delta\omega\tau = \Delta\omega\tau \tag{13}$$

$$\sin\Delta\omega T = \Delta\omega T$$

$$\cos\Delta\omega\tau = 1 - \tfrac{1}{2}(\Delta\omega\tau)^2$$

and $$\cos\Delta\omega T = 1 - \tfrac{1}{2}(\Delta\omega T)^2$$

Substituting (13) in (11), $R^2$ takes the form $$R^2 = \frac{\alpha}{a} \cdot \frac{\frac{1}{\alpha} + \alpha - 2\cos(\omega_c - \omega_f)\tau + (\Delta\omega\tau)^2\cos(\omega_c - \omega_f)\tau + 2\Delta\omega\tau \cdot \sin(\omega_c - \omega_f)\tau}{\frac{1}{a} + a - 2\cos(\omega_c - \omega_e)T + (\Delta\omega T)^2\cos(\omega_c - \omega_e)T + 2\Delta\omega T \cdot \sin(\omega_c - \omega_e)T}. \tag{14}$$

It can be shown from equation (14) that the transfer function is independent of frequency $\Delta\omega$ (i.e., no amplitude distortion due to propagation effects) when $$\frac{\frac{1}{\alpha} + \alpha - 2\cos(\omega_c - \omega_f)\tau}{\frac{1}{a} + a - 2\cos(\omega_c - \omega_e)T} = \tag{15}$$

$$\frac{\tau^2 \cos(\omega_c - \omega_f)\tau}{T^2 \cos(\omega_c - \omega_e)T} = \frac{\tau\sin(\omega_c - \omega_f)\tau}{T\sin(\omega_c - \omega_e)T}.$$

These conditions are, of course, satisfied when the equalizer is matched to the medium, i.e., $a = \alpha$, $\omega_e \omega_f$, and $T = \tau$. However, as $\alpha$, $\omega_f$ and $\tau$ vary arbitrarily as a function of time, these conditions cannot be met. The present invention is based upon the recognition that the equality given by (15) can be met for other combinations of $a$, $\omega_e$ and T. In particular, the loop delay T is given a fixed value, and the requirements for equality are met by adjusting only $a$ and $\omega_e$.

With respect to the loop attenuation $a$, it will be noted that it appears in the form of $(1/a + a)$. This means that there are two values of $a$ that will satisfy (15). One value will always be less than one while the other value will be greater than one. In all cases the preferred value of $a$ is the one which is less than 1, as a loop gain greater than or equal to one would lead to instability.

It will also be noted that $\alpha$ also appears as $(1/\alpha + \alpha)$, and $\alpha$ can be greater than one. However, it can be shown that proper delay equalization requires that $(1-a)$ and $(1-\alpha)$ have the same sign. When they do, the delay distortion of the equalized signal is negligible. If, however, the signs are not the same, amplitude equalization is obtained at the cost of doubling the delay distortion.

Adjustment of $\omega_e$

The proper adjustment of $\omega_e$ is made by equalizing the last two terms of (15). The first term can then be equalized by the appropriate adjustment of a. Equating these two terms, they can be rewritten as $$\frac{\tan(\omega_c - \omega_f)\tau}{\tan(\omega_c - \omega_e)T} = \frac{\tau}{T}. \tag{16}$$

Inasmuch as $\tau$ is not known, it is not possible to find $\omega_e$ directly by solving (16). Instead, we specify that it is sufficient to make $f_e = f_f$ over the range of frequencies $f_c \pm B$, where B is the signal bandwidth. Thus, in the illustrative example, $f_e = f_f$ when $|f_c - f_f| \leq 20$ MHz. When $|f_c - f_f| > B$, it will be shown that it is sufficient that $|f_c - f_e| = B$, provided $f_e$ and $f_f$ are located on the same side of $f_c$ and the loop attenuation a is properly adjusted.

Case A: Fade notch within 20 MHz of band center.

Inasmuch as the maximum path delay difference $\tau$ for a 26 mile hop at 4 GHz is 7.7 ns (see above) and, as specified, $|f_c - f_f| < 20$ MHz, we then have $$|(\omega_c - \omega_f)| \tau < 2\pi(0.154). \tag{17}$$

Accordingly, the tangent of the angle in (16) is substantially equal to the angle and we have $$\frac{\tan(\omega_c - \omega_f)\tau}{\tan(\omega_c - \omega_e)T} = \frac{(\omega_c - \omega_f)\tau}{(\omega_c - \omega_e)T} = \frac{\tau}{T} \tag{18}$$

or $$\omega_e \approx \omega_f. \tag{19}$$

Thus, the equalizer gain should be made to peak at the fade notch frequency whenever the latter falls within 20 MHz of band center. More generally, this is equally valid for B greater than 20 MHz. For example, in practice, $\tau$ is seldom greater than 1 nsec, in which case $\tan(\omega_c - \omega_f)\tau = (\omega_c - \omega_f)\tau$ for $\omega_c - \omega_f \leq 100$ MHz. Accordingly, the equalizer should be tuned to the notch frequency whenever the difference between band center and fade notch frequency does not exceed the bandwidth of the signal, provided this bandwidth B does not exceed 100 MHz.

Case B: Fade Notch more than 20 MHz from band center.

When the fade notch differs more than 20 MHz (or B) MHz from band center (i.e., $|f_c - f_f| > 20$ MHz) it can be shown that it is not necessary to track the notch frequency provided the loop attenuation is appropriately adjusted. In this case, the equalizer peak frequency $f_e$ is set such that $|f_c - f_e| = 20$ MHz, at the frequency nearest to $f_f$. With these settings, equation (14) reduces to $$R^2 = \frac{\alpha}{a} \cdot \frac{\frac{1}{\alpha} + \alpha - 2\cos(\omega_c - \omega_f)\tau + 2\Delta\omega\tau \cdot \sin(\omega_c - \omega_f)\tau}{\frac{1}{a} + a - 2\cos(\omega_c - \omega_e)T + 2\Delta\omega T \cdot \sin(\omega_c - \omega_e)T}. \tag{20}$$

An inspection of (20) shows that $R^2$ is independent of frequency when the loop attenuation a is such that $$\frac{\frac{1}{\alpha} + \alpha - 2\cos(\omega_c - \omega_f)\tau}{\frac{1}{a} + a - 2\cos(\omega_c - \omega_e)T} = \frac{\tau\sin(\omega_c - \omega_f)\tau}{T\sin(\omega_c - \omega_e)T}. \tag{21}$$

Having established the equalizer adjustments for different fade notch frequencies, the problem of determining that frequency remains.

Determination of Fade Notch Frequency

To determine the fade notch frequency, three samples of a steady digital spectrum (or pilot tones) at frequencies $(f_c - f_p)$, $f_c$ and $(f_c + f_p)$ are used. The amplitudes squared of these three samples are $A_1^2$, $A_2^2$ and $A_3^2$.

If the difference between the band center signal, and each of the two band edge signals (i.e., $A_1^2 - A_2^2$ and $A_3^2 - A_2^2$) is zero, or less than some specified threshold value, equalization is not necessary, and the equalizer loop gain should be made zero.

If $A_1^2 - A_2^2$ and/or $A_3^2 - A_2^2$ exceed the threshold value, equalization is required and, as noted, the fade notch frequency must be found. The first determination to be made is whether the fade notch frequency falls far outside the channel, or in or near the channel. To do this, we examine the magnitude of the expression $$A_1^2 + A_3^2 - A_2^2 = 2\alpha(\omega_p\tau)^2\cos(\omega_c - \omega_f)\tau. \tag{22}$$

Case 1

If (22) is negative, $\cos(\omega_c - \omega_f)\tau$ is also negative, and the fade notch nearest the band center is at a frequency for which $$\frac{\pi}{2} < |\omega_c - \omega_f|\tau < \frac{3\pi}{2}, \tag{23}$$

or $$|f_c - f_f| > \frac{1}{4\tau}. \tag{24}$$

Since $\tau \leq 7.7$ ns, it follows that $|f_c - f_f| > 32.5$ MHz.

Thus, for this case, the fade notch frequency is more than 20 MHz from centerband and, as indicated hereinabove, the equalizer gain for this condition should be adjusted to peak at a frequency 20 MHz from band center (i.e., $|f_c - f_e| = 20$ MHz). If $A_1^2 < A_3^2$, the gain peak should fall below $f_c$. If $A_1^2 > A_3^2$, the gain peak should fall above $f_c$.

Case 2

If $A_1^2 + A_3^2 - 2A_2^2$ given by equation (22) is positive then $$\cos(\omega_c - \omega_f)\tau > 0 \tag{25}$$

and the fade notch closest to center band will be at a frequency for which $$|\omega_c - \omega_f|\tau < \pi/2. \tag{26}$$

To find this frequency we form the ratio S where $$S = \frac{A_1^2 - A_2^2}{A_2^2 - A_3^2} = \frac{\omega_p\tau - 2\tan(\omega_c - \omega_f)\tau}{\omega_p\tau + 2\tan(\omega_c - \omega_f)\tau}. \tag{27}$$

Making the approximation that $\tan(\omega_c - \omega_f)\tau = (\omega_c - \omega_f)\tau$ and solving (27) for $(\omega_c - \omega_f)$, we obtain $$\omega_c - \omega_f = \frac{\omega_p}{2}\left(\frac{1 + S}{1 - S}\right) \tag{28}$$

Solving (28) we obtain $f_f$ and adjust $f_e = f_f$. That is $$f_e = f_c - \frac{f_p}{2}\left(\frac{1+S}{1-S}\right) \quad (29)$$

Figure 3:
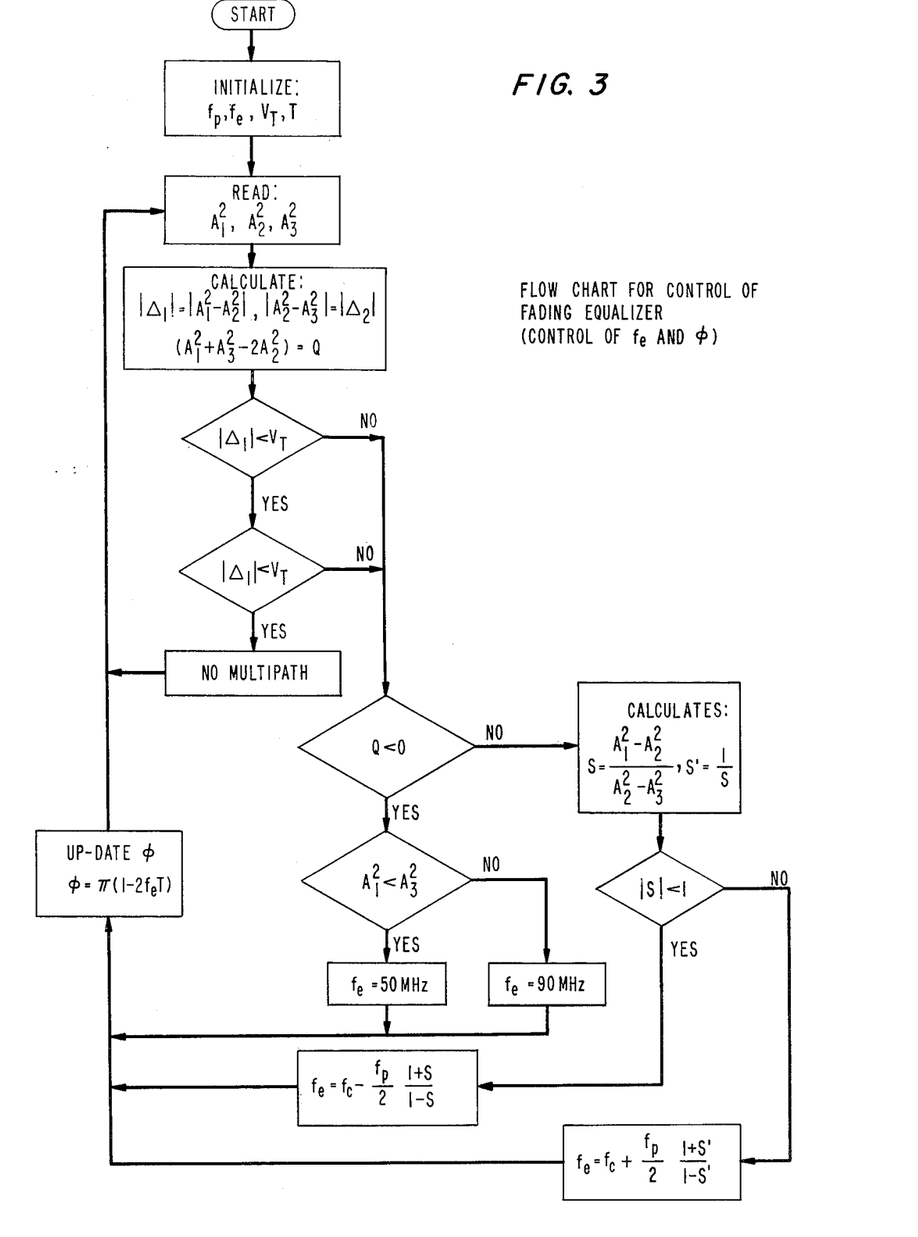
FIG. 3 shows a flow chart of the procedure for adjusting the phase angle in the feedback loop of the equalizer.

FIG. 3 is a flow chart which summarizes the above-described procedure for adjusting the phase angle of the equalizer. In a given system in which $f_c$, $f_p$ and T are specified, the amplitudes of the three pilot tones at frequencies $f_c - f_p$, $f_c$, and $f_c + f_p$ are measured and $A_1{}^2$, $A_2{}^2$ and $A_3{}^2$ derived. If the magnitude of the differences $|\Delta_1| = |A_1{}^2 - A_2{}^2|$ and $|\Delta_2| = |A_2{}^2 - A_3{}^2|$ are less than the specified threshold $V_T$, no multipath phase correction is required. If either of these differences is greater than $V_T$, the summation $Q = A_1{}^2 + A_3{}^2 - 2A_2{}^2$ is examined. If Q is less than zero, the fade notch is outside the band and $f_e$ is adjusted to a fixed frequency above or below $f_c$. To determine if this frequency is greater or less than $f_c$, $A_1{}^2$ is compared to $A_3{}^2$. If $A_1{}^2$ is less than $A_3{}^2$, $f_e$ is less than $f_c$. If $A_1{}^2$ is greater than $A_3{}^2$, $f_e$ is greater than $f_c$. In the illustrative embodiment in which $f_c$ is equal to 70 MHz and the fixed frequency difference is 20 MHz, $f_e$ is either 50 or 90 MHz.

If, on the other hand, Q is greater than zero, the ratios S and S' are investigated and, depending upon their magnitudes, a phase correction is made which is a function of either S or S'.

As noted above, an approximation was made by substituting the angle for the tangent of the angle in equation (27). As a practical matter, the resulting tuning error is relatively small when the fade notch occurs within band. The error increases when the notch falls outside the band. However, in this latter case, the in-band distortion is relatively small to begin with and equalizer operation remains satisfactory.

Having adjusted the phase shift so as to tune the loop in response to the frequency of the fade notch, it now remains to adjust the loop gain to satisfy equation (21). This is done by means of a feedback control mechanism that seeks to produce equal tone amplitudes at the output of the equalizer. It is sufficient to make the band center signal tone equal to an edge band signal tone provided the proper edge band tone is selected. In particular, if the fade notch falls below band center, the band center tone is made equal to the upper edge band tone. Conversely, if the fade notch is above band center, the band center tone is made equal to the lower edge band tone.

Figure 4:
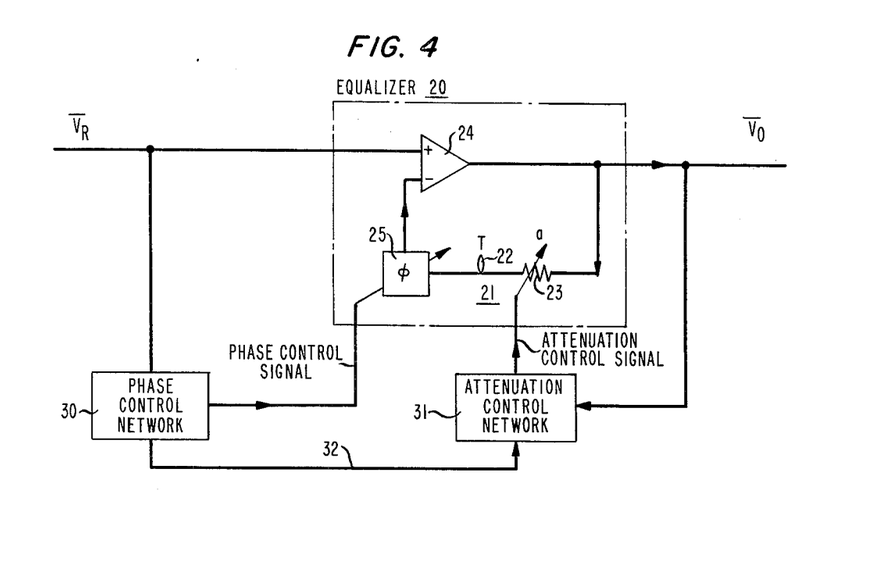
FIG. 4 shows, in block diagram, a first embodiment of an equalizer in accordance with the invention.

FIG. 4 shows, in block diagram, an equalizer in accordance with the present invention, incorporating the controls described hereinabove. Using the same identification numerals as in FIG. 2, the equalizer 20 includes a differing network 24, for forming the difference between the input signal and a component of the equalizer output signal, and a feedback loop 21 for coupling the component of output signal to said differencing network. Feedback loop 21 includes a delay network 22, an adjustable attenuator 23, and a variable phase shifter 25. The amount of phase shift introduced by the phase shifter is determined by a phase control network 30 which samples the input signal and generates the appropriate phase control in a manner to be described in greater detail hereinbelow.

Similarly, an attenuation control network 31 samples the same portion of the frequency spectrum of the equalizer output signal $\overline{V}_o$ and, with information derived from the phase control network, generates an attenuation control signal for controlling the loop attenuation control 23.

Figure 5:
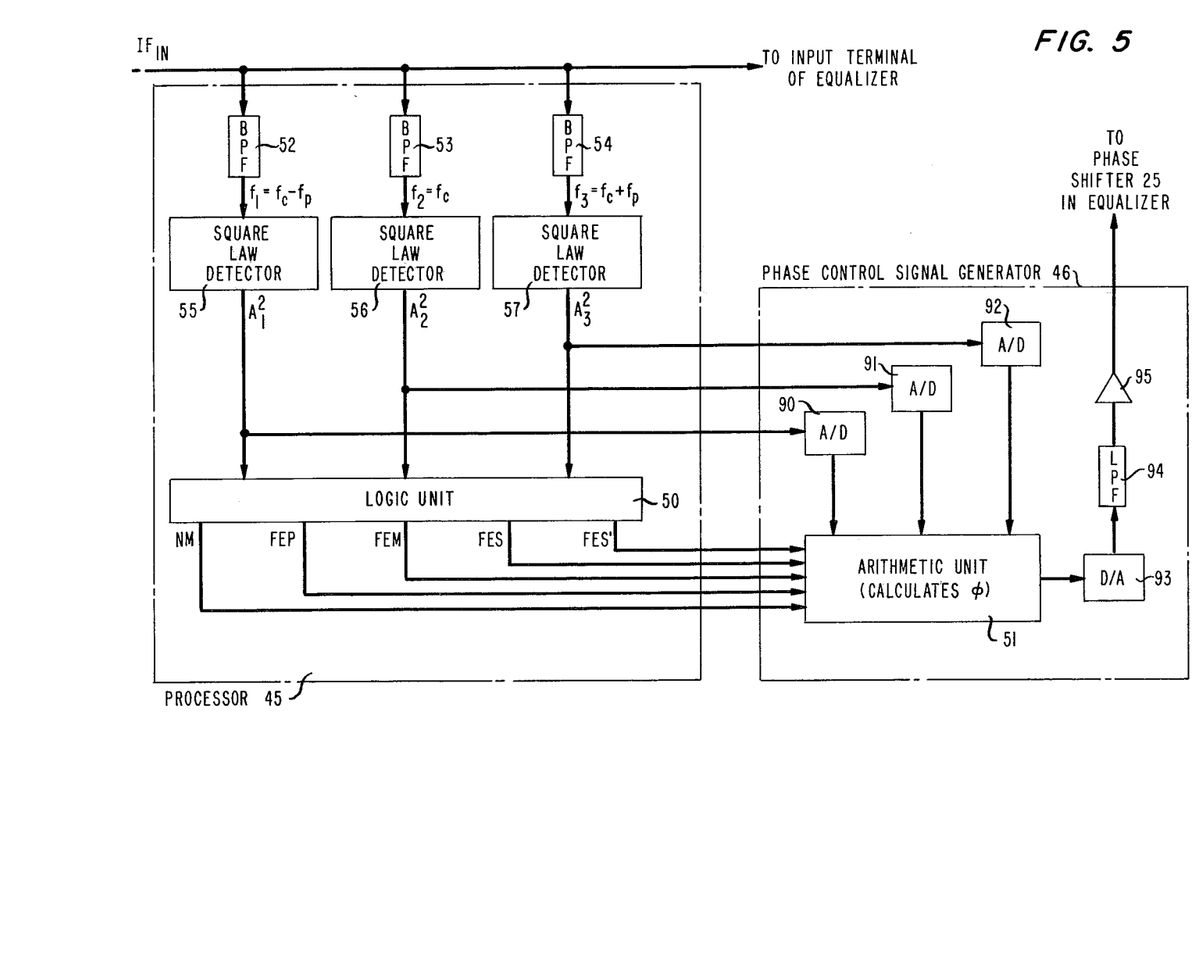
FIG. 5 shows, in block diagram, an illustrative embodiment of a phase control network.

FIG. 5, now to be considered, shows, in block diagram, an illustrative embodiment of phase control network 30 comprising a processor 45 and a phase control signal generator 46. In the processor, bandpass filters 52, 53 and 54, connected to the input side of the equalizer, couple components of the pilot tones at frequencies $f_c - f_p$, $f_c$ and $f_c + f_p$ to square law detectors 55, 56 and 57, respectively. The outputs, $A_1{}^2$, $A_2{}^2$ and $A_3{}^2$, from the detectors are, in turn, coupled to logic unit 50 and to an arithmetic unit 51 in the phase control signal generator 46. Also coupled to arithmetic unit 51 are the logic output signals, NM, FEP, FEM, FES and FES' from the logic unit. The output from arithmetic unit 51 is coupled to and serves to adjust the phase shifter in the equalizer feedback path.

Figure 6:
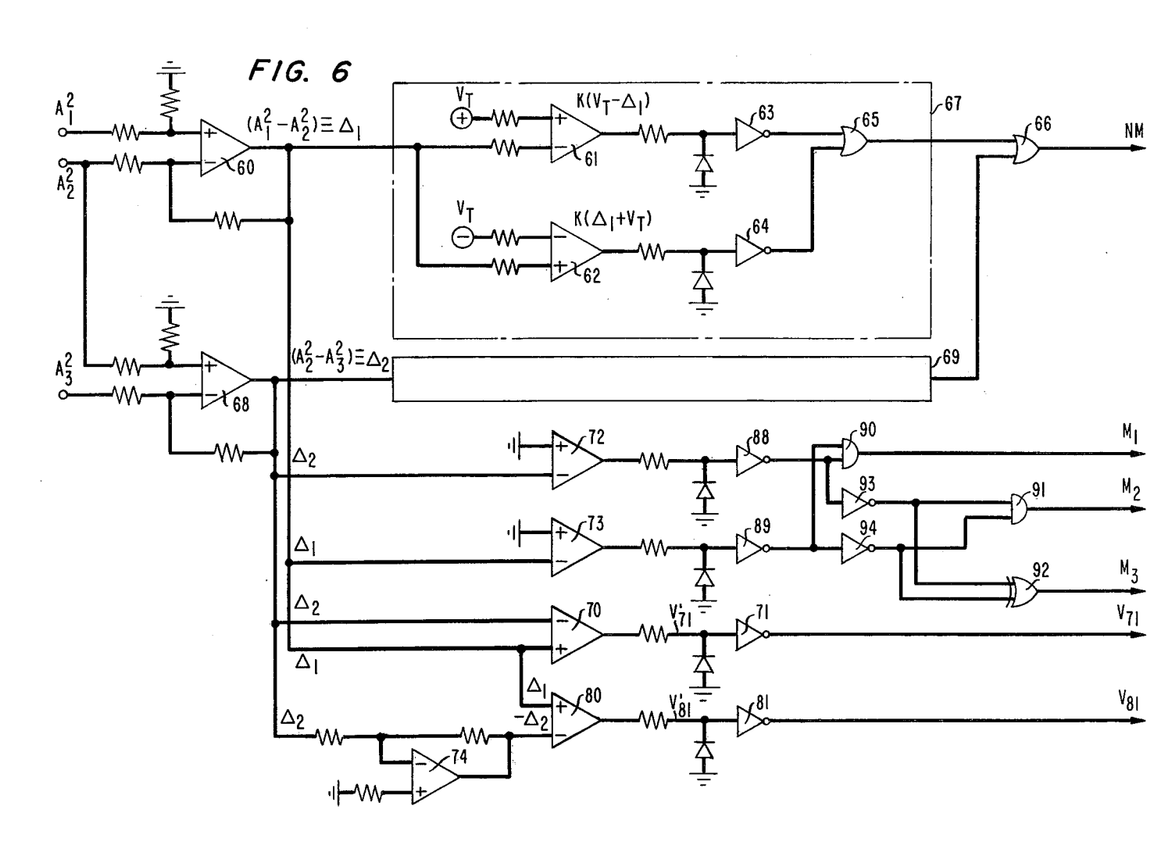
FIGS. 6, 7 and 8 illustrate circuits for performing the logic steps indicated in the flow chart shown in FIG. 3.
Figure 7:
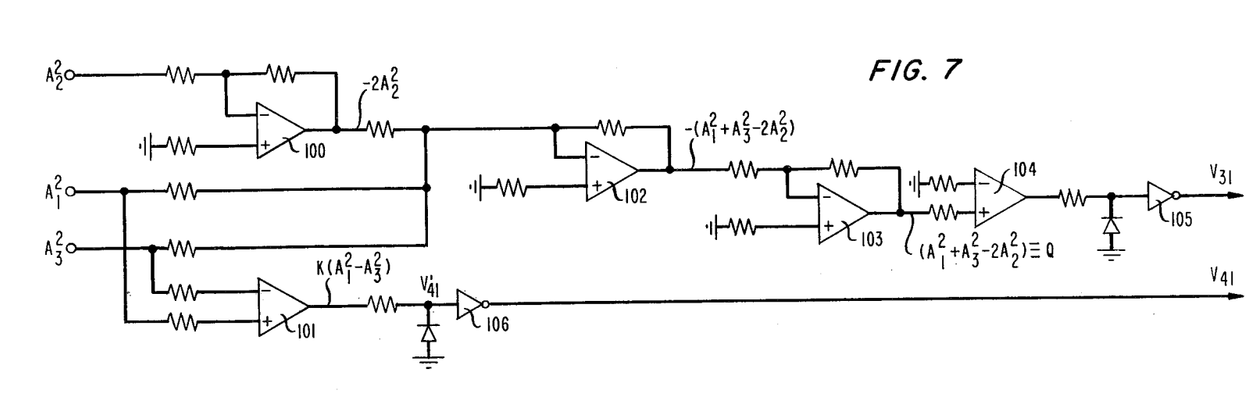
Figure 8:
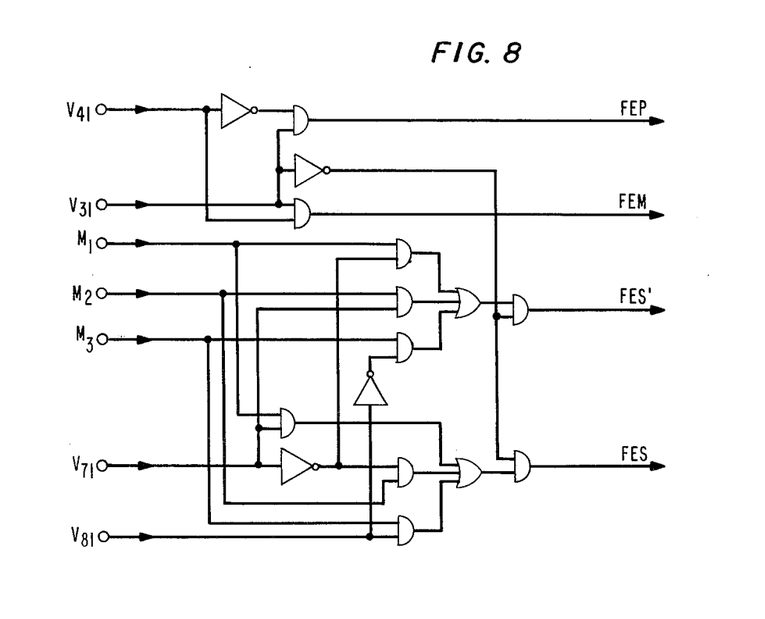

Circuits for performing the logical steps indicated in the flow chart shown in FIG. 3 are illustrated in FIGS. 6, 7 and 8. Referring to FIG. 6, detector outputs $A_1{}^2$ and $A_2{}^2$ are connected to the input ports of op-amp 60 whose output is equal to $A_1{}^2 - A_2{}^2 = \Delta_1$. The latter is then compared to a threshold signal $V_T$ in differential amplifier 61, and to threshold signal $-V_T$ in amplifier 62, both of which are a part of a network 67. If $\Delta_1 < V_T$, the output of amplifier 61, $K(V_T - \Delta_1)$, where K denotes the amplifier gain, is a large positive signal which saturates inverter 63 such that its output is substantially zero, corresponding to logic level 0. Conversely, if $\Delta_1 > V_T$, the output from amplifier 61 tends to be a large negative voltage. As a result, a large positive output signal, corresponding to logic level 1, is produced at the output of inverter 63.

Similarly, depending upon the relative values of $\Delta_1$ and $V_T$, the output from inverter 64 is logic level 0 if $\Delta_1 > -V_T$ or logic level 1 if $\Delta_1 < -V_T$.

The outputs from inverters 63 and 64 are coupled to OR gate 65 whose output is coupled to one of the input ports of OR gate 66.

In similar fashion, the detector outputs $A_2{}^2$ and $A_3{}^2$ are connected to the input ports of op-amp 68 whose output is equal to $A_2{}^2 - A_3{}^2 = \Delta_2$. The latter is then compared to threshold signals $V_T$ and $-V_T$ in a network 69 which is identical to network 67. The output from network 69 is coupled to the second input port of OR gate 66.

If the magnitudes of both $\Delta_1$ and $\Delta_2$ are less than $V_T$, the output, NM, of OR gate 66 is logic level 0, indicating that no phase correction is required. For all other conditions, the output of OR gate 66 is logic level 1.

The outputs from op-amps 60 and 68 are also connected to the input ports of op-amp 70, whose output is proportional to $(\Delta_1 - \Delta_2)$. If both $\Delta_1$ and $\Delta_2$ are positive, and $\Delta_2$ is greater than $\Delta_1$, then the output $V_{71}$ of the following inverter 71 is logic level 1. Since the parameter S is given as the ratio $\Delta_1/\Delta_2$, logic level 1 indicates that $|S| < 1$. If $\Delta_2 < \Delta_1$, then $V_{71}$ is zero, indicating $|S| > 1$.

Similarly, if both $\Delta_1$ and $\Delta_2$ are less than zero, logic 0 for $V_{71}$ indicates $|S| < 1$, whereas logic 1 for $V_{71}$ indicates $|S| > 1$.

A further comparison is made between $\Delta_1$ and $\Delta_2$ by means of amplifiers 74, 80, and inverter 81. In particular, $\Delta_2$ is coupled to the negative input port of amplifier 74. The output, $-\Delta_2$, from amplifier 74 is, in turn, coupled to negative input port of amplifier 80. Signal $\Delta_1$ is coupled to the positive input port of amplifier 80. The resulting output signal $K(\Delta_1+\Delta_2)$ is coupled to inverter 81. It can be shown that if $\Delta_1>0$ and $\Delta_2<0$, the output signal $V_{81}$ from inverter 81 is at logic level 1 when $|\Delta_2|>\Delta_1$, indicating that $|S|<1$. If, on the other hand, $|\Delta_2|<\Delta_1$, a logic 0 signal is produced, indicating $|S|>1$.

The outputs of amplifiers 60 and 68 are also coupled to the negative input ports of differential amplifiers 73 and 72, respectively, where, in conjunction with inverters 88, 89, 93, 94, AND gates 90 and 91, and exclusive OR gate 92, produce three additional output signals $M_1$ and $M_2$ and $M_3$ as functions of $\Delta_1$ and $\Delta_2$. Specifically, if $M_1$ is at logic level 1, both $\Delta_1$ and $\Delta_2$ are greater than zero. If $M_2$ is at logic level 1, both $\Delta_1$ and $\Delta_2$ are less than zero. Finally, if $M_3$ is at logic level 1, $\Delta_1$ is greater than zero, and $\Delta_2$ is less than zero.

Two additional logic signals $V_{31}$ and $V_{41}$, related to the function $Q=A_1^2+A_3^2-2A_2^2$, are generated by means of the circuit shown in FIG. 7. To produce $V_{31}$, signal $A_2^2$ from detector 56 is coupled to the negative input port of op-amp 100 to produce an output signal $-2A_2^2$. This is coupled, along with signal $A_1^2$ from detector 55, and signal $A_3^2$ from detector 57, to the negative input port of op-amp 102 to produce a signal $-(A_1^2+A_3^2-2A_2^2)$ at the negative input port of the following op-amp 103. The output of amplifier 103, $A_1^2+A_3^2-2A_2^2=Q$, is coupled to the positive input port of differential amplifier 104 and then through inverter 105 to form logic signal $V_{31}$. If $Q<0$, $V_{31}$ is at logic level 1. If $Q>1$, $V_{31}$ is at logic level 0.

Logic signal $V_{41}$ is formed by coupling signal $A_3^2$ to the negative input port of differential amplifier 101 and signal $A_1^2$ to the positive input port of amplifier 101. The resulting output signal $K(A_1^2-A_3^2)$ is coupled to inverter 106, whose output signal is $V_{41}$. If $A_1^2>A_3^2$, $V_{41}$ is at logic level 0. If, on the other hand, $A_1^2<A_3^2$, $V_{41}$ is at logic level 1.

The several signals, $V_{31}$, $V_{41}$, $M_1$, $M_2$, $M_3$, $V_{71}$ and $V_{81}$ are used to generate the arithmetic unit control signals FEP, FEM, FES and FES'. An illustrative logic circuit for doing this is shown in FIG. 8. The logic unit truth table is given in Table I.

As explained hereinabove, the feedback loop is tuned, by adjustment of the phase shifter, depending upon the location of the notch frequency. A logic 1 for signal FEP indicates $f_e=90$ MHz. A logic signal 1 for FEM indicates $f_e=50$ MHz. A logic signal 1 for FES indicates $f_e=f(S)$ and, finally, a logic signal 1 for FES' indicates $f_e=f(S')$. The logic equations for Table I are given by:

$$FEP = V_{31} \cdot \overline{V_{41}}$$

$$FEM = \overline{V_{31}} \cdot V_{41}$$

$$FES = \overline{V_{31}} \cdot M_1 \cdot V_{71} + \overline{V_{31}} \cdot M_2 \cdot \overline{V_{71}} + \overline{V_{31}} \cdot M_3 \cdot V_{81}$$

and $$FES' = \overline{V_{31}} \cdot M_1 \cdot \overline{V_{71}} + \overline{V_{31}} \cdot M_2 \cdot V_{71} + \overline{V_{31}} \cdot M_3 \cdot \overline{V_{81}}$$

where a bar (—) over a variable indicates negation.

A summary of the various voltages is given in Table II.

TABLE I

LOGIC UNIT - TRUTH TABLE

| INPUT | | | | | | | OUTPUT | | | |
|---|---|---|---|---|---|---|---|---|---|---|
| $V_{31}$ | $V_{41}$ | $M_1$ | $M_2$ | $M_3$ | $V_{71}$ | $V_{81}$ | FEP | FEM | FES | FES' |
| 1 | 1 | | | | | | | 1 | | |
| 1 | 0 | | | | | | 1 | | | |
| 0 | 0 | 1 | | | 1 | | | | 1 | |
| 0 | 0 | | 1 | | 0 | | | | 1 | |
| 0 | 0 | | | 1 | | 1 | | | 1 | |
| 0 | 0 | 1 | | | 0 | | | | | 1 |
| 0 | 0 | | 1 | | 1 | | | | | 1 |
| 0 | 0 | | | 1 | | 0 | | | | 1 |

$f_e = 90$ MHz
$f_e = 50$ MHz $FES = f_e(S) = 70 - \dfrac{f_p}{2}\left(\dfrac{1+S}{1-S}\right)$ MHz $FES' = f_e(S') = 70 + \dfrac{f_p}{2}\left(\dfrac{1+S'}{1-S'}\right)$ MHz

TABLE II

| | Voltage | Logic Level | Meaning |
|---|---|---|---|
| (1) | $V_{31}$ | 1 | $Q < 0$ |
| (2) | $V_{31}$ | 0 | $Q > 0$ |
| (3) | $V_{41}$ | 1 | $A_1^2 < A_3^2$ |
| (4) | $V_{41}$ | 0 | $A_1^2 > A_3^2$ |
| (5) | $M_1$ | 1 | $\Delta_1 > 0$ and $\Delta_2 > 0$ |
| (6) | $M_2$ | 1 | $\Delta_1 < 0$ and $\Delta_2 < 0$ |
| (7) | $M_3$ | 1 | $\Delta_1 > 0$ and $\Delta_2 < 0$ |
| (8) | $V_{71}$ | 1 | $|\Delta_2| < |\Delta_1|$ and (6) holds, then $|S'| < 1$ |
| | $V_{71}$ | 1 | $\Delta_2 > \Delta_1$ and (5) holds, then $|S| < 1$ |
| (9) | $V_{71}$ | 0 | $\Delta_2 < \Delta_1$ and (5) holds, then $|S'| < 1$ |
| | $V_{71}$ | 0 | $|\Delta_2| > |\Delta_1|$ and (6) holds, then $|S| < 1$ |
| (10) | $V_{81}$ | 1 | $|\Delta_2| > |\Delta_1|$ and (7) holds, then $|S| < 1$ |
| (11) | $V_{81}$ | 0 | $|\Delta_2| < |\Delta_1|$ and (7) holds, then $|S'| < 1$ |

Figure 9:
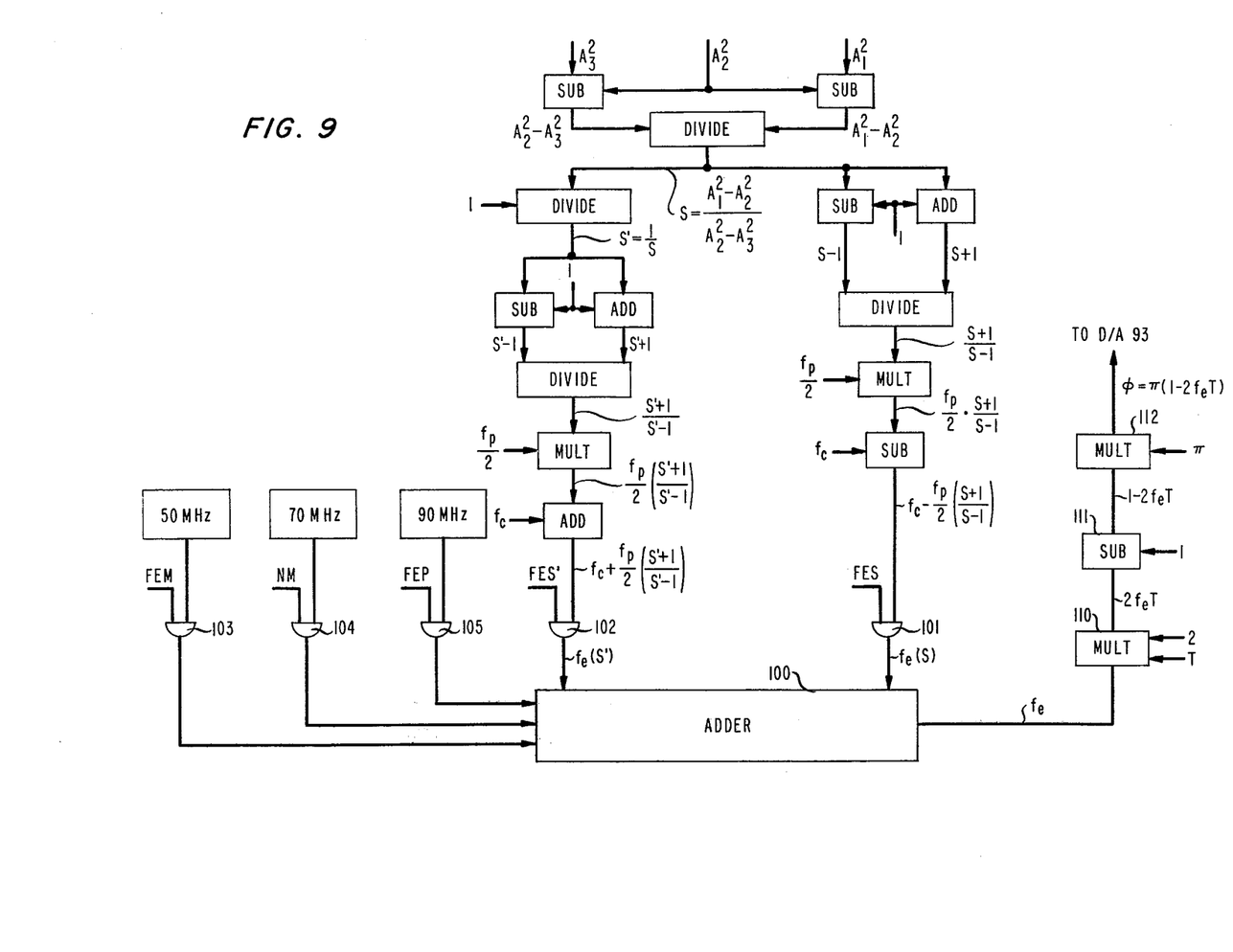
FIG. 9 is a flow diagram of the arithmetic unit for calculating the phase setting.

FIG. 9 is a flow diagram of the arithmetic unit 51 of phase control signal generator 46. As illustrated in FIG. 5, signals $A_1^2$, $A_2^2$ and $A_3^2$ are coupled to arithmetic unit 51 through A/D converters 90, 91, and 92, respectively, which advantageously convert the detected signals to digital form. In unit 51 the signals are operated upon to form signals proportional to $f_e(S)$ and $f_e(S')$. In addition, binary signals indicative of the fixed frequencies 50, 70 and 90 MHz, used in the illustrative embodiment, are provided. Each is, in turn, gated by the appropriate logic signal FES, FES', FEM, NM, and FEP in respective AND gates 101, 102, 103, 104 and 105. The output from these gates is combined in adder 100 whose output is a function of the appropriate frequency $f_e$.

The output of adder 100 is subsequently converted to a phase control signal $\phi$ by means of multiplier 110, subtraction unit 111 and multiplier 112. A D/A converter 93 converts $\phi$ to an analog format for application to phase shifter 25 in the equalizer feedback loop 21, as illustrated in FIG. 4.

Having determined the setting for the phase shifter to properly tune the equalizer feedback loop, the gain of the loop must now be adjusted. As indicated hereinabove, it is sufficient to make the amplitude of the band center pilot tone at the output of the equalizer equal to one of the band edge tones provided the proper tone is selected. In particular, if the fade notch falls below band center, the loop gain is adjusted such that the band center tone is equal to the upper edge band tone. Designating the detected output tones as $B_1^2$, $B_2^2$ and $B_3^2$, with $A_1^2 < A_3^2$, the gain is adjusted such that $B_2^2 = B_3^2$. Conversely, if the fade notch falls above band center, the loop gain is adjusted such that the band center tone is equal to the lower edge band tone. Thus, with $A_1^2 > A_3^2$, the loop gain is adjusted such that $B_2^2 = B_1^2$. A circuit, corresponding to gain control network 31 of FIG. 4, for making these determinations and for generating the gain control signal is illustrated in block diagram in FIG. 10. As shown, logic signal NM and the upper and lower edge pilot tone signals $A_1^2$ and $A_3^2$, (derived from the phase, control network 30) are provided to indicate, respectively, if multipath fading has occurred and, if so, where the fade notch is located. To provide the output pilot tones signals $B_1^2$, $B_2^2$ and $B_3^2$, bandpass filters 120, 121 and 122 couple components of the pilot tones in the equalizer output signal to square law detectors 123, 124 and 125, respectively. Signals $B_1^2$ and $B_2^2$ are, in turn, coupled to an op-amp 127 to produce an output signal $$\Delta_1' = K(B_2^2 - B_1^2). \qquad (30)$$

Figure 10:
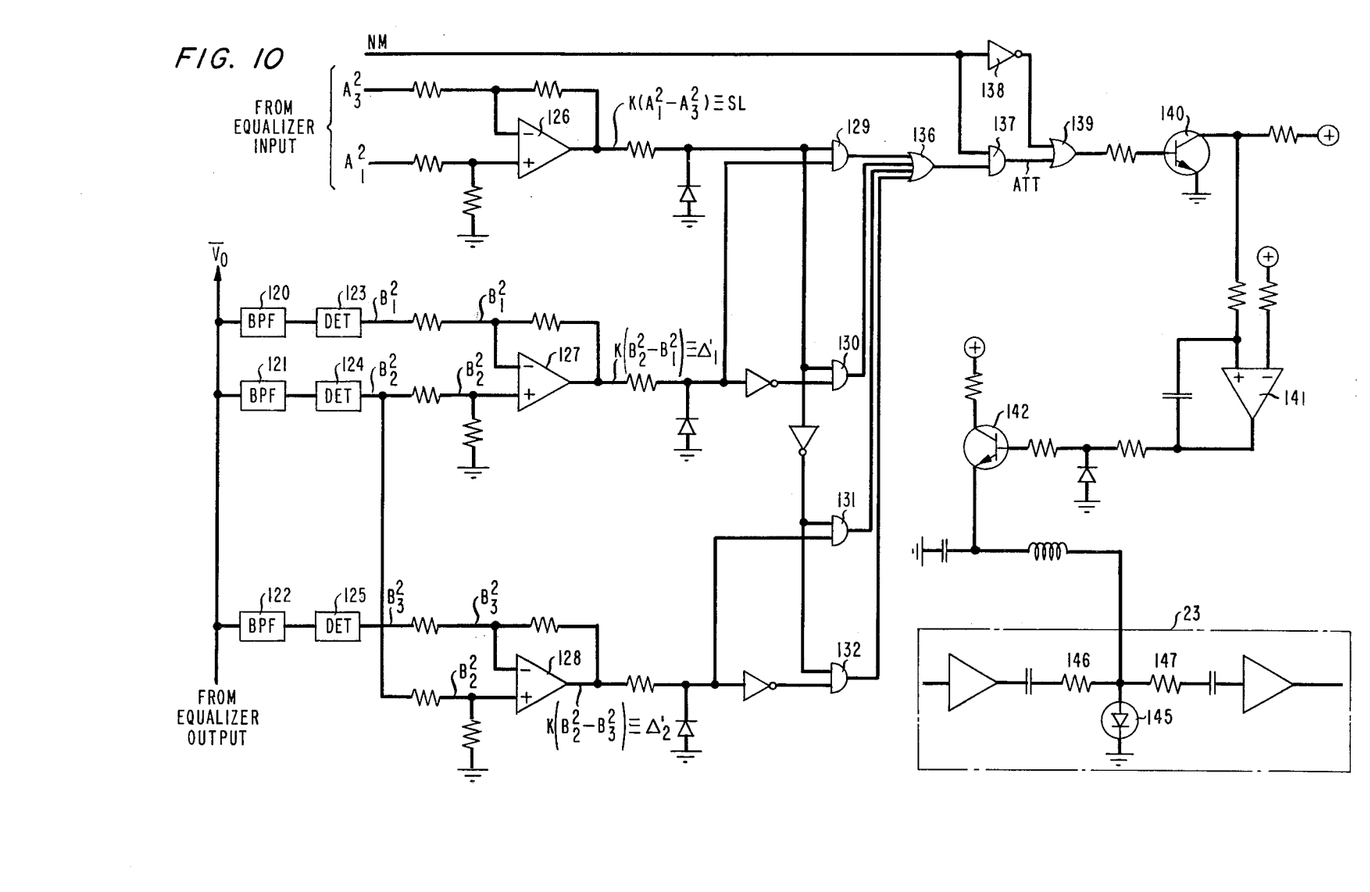
FIG. 10 shows a circuit for adjusting the loop attenuator setting.

Similarly, signals $B_2^2$ and $B_3^2$ are coupled to an op-amp 128 to produce an output signal $$\Delta_2' = K(K B_2^2 - B_3^2). \qquad (31)$$

Input pilot tone signals $A_1^2$ and $A_3^2$ are coupled to a third op-amp 126 to produce an output signal $$SL = K(A_1^2 - A_3^2). \qquad (32)$$

If $A_1^2 > A_3^2$, indicating that the fade notch occurs above band center, signal SL is at logic level 1. In this case, the two pilot tones of interest are the center tone $B_2^2$ and the lower edge tone $B_1^2$ since, as indicated above, when the notch is above band center, the amplitudes of the lower and center pilot tones are equalized. Thus, it is signal $\Delta_1'$ from amplifier 127 that we wish to examine. Accordingly, signal SL is coupled to AND gate 129 along with signal $\Delta_1'$, and to AND gate 130 along with signal $\overline{\Delta_1'}$.

If, on the other hand, $A_1^2 < A_3^2$, SL is negative (logic level zero), and the signals of interest are $B_2^2$ and $B_3^2$. Thus, for this case, an inverted signal $\overline{SL}$ is coupled to AND gate 131 along with signal $\Delta_2'$ and to AND gate 132 along with inverted signal $\overline{\Delta_2'}$.

The outputs from all of the AND gates are coupled to OR gate 136 whose output is coupled to AND gate 137 along with logic signal NM. IF logic signal NM is at logic level 0, indicating no multipath, the feedback loop is disabled since no correction is required. If, on the other hand, signal NM is at logic level 1, a signal is produced at the output of gate 137 in response to a signal from OR gate 136.

If the NM signal is zero, indicating that there is no multipath, the equalizer feedback loop should be disabled. This is accomplished by means of inverter 138 and a second OR gate 139. When NM is at logic level 1, the output of OR gate 139 is controlled by the output from AND gate 137. If, however, NM is at logic level 0, AND gate 137 is disabled, and the output from OR gate 139 is controlled by the output of inverter 138, which is NM. The logic equation for the gain control networks is given by $$ATT = NM \cdot (SL \cdot \Delta_1' + \overline{SL} \cdot \Delta_2') + \overline{NM}.$$

The truth table of the circuit is given in TABLE III.

TABLE III

| NM | SL | $\Delta_1'$ | $\Delta_2'$ | ATT |
|---|---|---|---|---|
| 1 | 1 | 1 |   | 1 |
| 1 | 1 | 0 |   | 0 |
| 1 | 0 |   | 1 | 1 |
| 1 | 0 |   | 0 | 0 |
| 0 |   |   |   | 1 |

When ATT is at logic 1, the attenuation in the feedback loop is increased. The conversion of the digital output from OR gate 139 to a smoothly varying gain control signal is accomplished by transistor amplifier 140, integrator 141 which generates a voltage ramp, and transistor stage 142 which converts the voltage into a current ramp.

Attenuator 23, in FIG. 4, is shown in FIG. 10 as comprising a T-network formed by a pair of series resistors 146 and 147, and a shunt PIN diode 145. As the current injected into the diode increases, the conductance of the diode increases. This results in a corresponding increase in attenuation through the attenuator. Conversely, a decrease in current decreases the attenuation.

Figure 11:
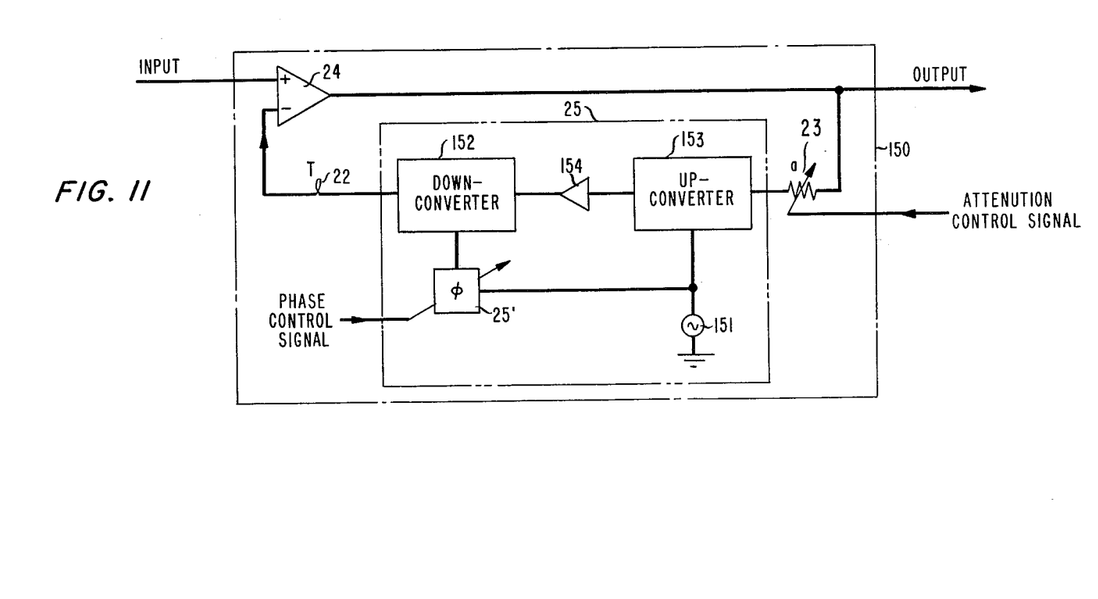
FIG. 11 is an alternate embodiment of the invention.

In the embodiment of the equalizer shown in FIG. 4, phase shift 25 must be sufficiently broadband to accommodate the entire signal bandwidth. In a broadband system this can be difficult to achieve. Accordingly, a circuit configuration that reduces the bandwidth demands placed upon the phase shifter is to be preferred. FIG. 11, now to be considered, shows an alternate embodiment of an equalizer in which this is achieved. In this embodiment, the feedback loop 21 of equalizer 150 includes, as in the embodiment of FIG. 4, a delay network 22, a phase shift network 25, and a variable attenuator 23. The variable phase shifter 25', however, is now located in a local oscillator circuit that supplies signals from a local oscillator 151 to up-converter 152 and a down-converter 153 located in the feedback loop. In particular, phase shifter 25', (located in either of the two signal paths connecting oscillator 151 and converters 152 and 153), provides a relative phase shift between the local oscillator signals applied thereto. The net result is to produce a phase shift in the feedback loop equivalent to that produced by phase shifter 25 in the embodiment of FIG. 4. However, in this embodiment the phase shifter need only be designed to operate at the single frequency of the local oscillator.

A buffer amplifier 154 is advantageously placed between the converters.

Summary

It has been shown that dynamic equalization can be obtained by means of a fade equalizer comprising a feedback loop including a fixed time delay, an adjustable phase shifter, and an adjustable attenuator. The equalizer is adapted to track changes in both the frequency and amplitude of the fade notch, and to provide dynamic compensation in accordance with these changes.

Illustrative logic circuits for generating the required control signals have been described. However, it will be recognized that other means for generating these signals can just as readily be used.

In the discussion hereinabove, T is characterized as a fixed delay. To obtain some idea of the range of values that T can assume, reference is made to the previously made assumption that the $$\tan(\omega_c - \omega_e)T = (\omega_c - \omega_e)T.$$

An examination of the table of tangents shows that this equality is substantially true for $$T \leq \tfrac{1}{8}B$$

where $$B = |\omega_c - \omega_e|_{max}.$$

The minimum value is limited by the fact that as T becomes smaller, the required attenuation a approaches unity. This means that as T becomes smaller the loop operates closer to the point of instability, which is undesirable. A relatively large value of T is, accordingly, preferred. A practical minimum value would be about 1/15B. Thus, a working range of values for the fixed delay is given by $$1/15B < T < 1/8B.$$

I claim:

1. An adaptive fade equalizer comprising:
differencing means (24) for forming a difference between an input signal to said equalizer and a component of the output signal from said differencing means, where said differencing means output signal is also the equalizer output signal, and said input signal has a center frequency $f_c$ and a bandwidth B;
a feedback loop (21) for coupling said component of output signal to said differencing means;
said loop including;
a fixed delay T (22);
a variable attenuator (23);
and a variable phase shifter (25);
a phase control network (30) for determining the location of a fade notch in said input signal, and for generating a phase control signal for adjusting said phase shifter in response to said determination;
and an attenuation control network (31) for comparing the relative amplitudes of signal components at selected frequencies in said input and output signals, and for generating an attenuation control signal for adjusting said attenuator in response to said comparisons.

2. The equalizer according to claim 1 wherein:
said input signal occupies the band $f_c \pm B/2$;
said fade notch occurs at a frequency $f_f$ that falls within the band $f_c \pm B$;
and wherein said variable phase shifter (25) is adjusted to peak the equalizer response at a frequency $f_e$ equal to $f_f$.

3. The equalizer according to claim 1 wherein:
said input signal occupies the band $f_c \pm B/2$;
said fade notch occurs at a frequency $f_f$ that falls outside the band $f_c \pm B$;
and wherein said variable phase shifter is adjusted to peak the equalizer response at a frequency $f_c + B$ when $f_f > (f_c + B)$, and at a frequency $f_c - B$ when $f_f < (f_c - B)$.

4. The equalizer according to claim 1 wherein:
said input signal occupies the band $f_c \pm B/2$;
said phase control network generates said phase control signal by a process including the steps of:
detecting portions of the input signal spectrum centered at frequencies $f_c - f_p$, $f_c$ and $f_c + f_p$, to produce signals of amplitudes $A_1^2$, $A_2^2$ and $A_3^2$, respectively;
forming signals $\Delta_1$, $\Delta_2$ and Q where $\Delta_1 = A_1^2 - A_2^2$;

$\Delta_2 = A_2^2 - A_3^2$;

and $Q = (A_1^2 + A_3^2 - 2A_2^2)$;

comparing $|\Delta_1|$ and $|\Delta_2|$ to a reference signal $V_T$ and determining if both $|\Delta_1|$ and $|\Delta_2|$ are less than $V_T$, in which case no change in the phase control signal is made;
comparing signal Q to zero of either $|\Delta_1|$ or $|\Delta_2|$ if greater than $V_T$ $$\text{forming the signals } S = \frac{A_1^2 - A_2^2}{A_2^2 - A_3^2}$$

and $S' = 1/S$, and comparing $|S|$ to one if $Q > 0$;
generating a signal corresponding to a frequency $$f_e \text{ equal to } f_c - \frac{f_p}{2}\left(\frac{1+S}{1-S}\right) \text{ when } |S| < 1,$$

$$\text{and } f_c + \frac{f_p}{2}\left(\frac{1+S'}{1-S'}\right) \text{ when } |S| > 1;$$

comparing $A_1^2$ to $A_3^2$ if $Q < 0$;
generating a signal corresponding to a frequency $f_e = f_c - B$ when $A_1^2 < A_3^2$, and $f_e = f_c + B$ when $A_1^2 > A_3^2$.

5. The equalizer according to claim 4 wherein the phase shift $\phi$ introduced by said variable phase shifter (25) is given by $$\phi = \pi(1 - 2f_e T).$$

6. The attenuator according to claim 1 wherein:
the input signal occupies the band $f_c \pm B/2$;
and wherein the fixed delay T is within the range $B/15 \leq T \leq B/8$.

7. The equalizer according to claim 1 wherein:
the input signal occupies the band $f_c \pm B/2$;
and wherein said control networks (30, 31) include:

means for detection portions of the input signal spectrum centered at frequencies $f_c-f_p$, $f_c$ and $f_c+f_p$ where $f_p$ is a frequency difference less than $B/2$, to produce signals of amplitudes $A_1^2$, $A_2^2$ and $A_3^2$, respectively;

means for detecting said spectral portions in the equalizer output signal to produce signals of amplitudes $B_1^2$, $B_2^2$ and $B_3^2$, respectively;

means for determining the location of the fade notch by a comparison of said signal amplitudes $A_1^2$, $A_2^2$ and $A_3^2$;

and means for adjusting said variable attenuator (23) in response to said determination.

8. The equalizer according to claim 7 wherein:
said attenuator (23) is adjusted such that $B_1^2 = B_2^2$ when $A_1^2 > A_3^2$,
and wherein said attenuator (23) is adjusted such that $B_2^2 = B_3^2$ when $A_1^2 < A_3^2$.

9. The equalizer according to claim 1 wherein said variable phase shifter 25 comprises, in cascade, an up-converter 152, and a down-converter 153;
a local oscillator 151 coupled to each of said converters;
and phase shift means (25') for varying the relative phase of the local oscillator signals coupled to said converters.

* * * * *

UNITED STATES PATENT AND TRADEMARK OFFICE
CERTIFICATE OF CORRECTION

PATENT NO. : 4,330,764
DATED : May 18, 1982
INVENTOR(S) : Hotze Miedema

It is certified that error appears in the above—identified patent and that said Letters Patent is hereby corrected as shown below:

On Sheet 7, FIG. 9 change all appearances of "S+1, S-1, S'+1 and S'-1" to read --1+S, 1-S, 1+S' and 1-S'--. Column 6, Equation (27), add a minus sign (-) after the last occurrence of the equal sign (=).

Signed and Sealed this

Twenty-eighth Day of February 1984

[SEAL]

Attest:

GERALD J. MOSSINGHOFF

Attesting Officer

Commissioner of Patents and Trademarks